(12) United States Patent  
Tsuchitori et al.

(10) Patent No.: US 12,202,464 B2  
(45) Date of Patent: Jan. 21, 2025

(54) VEHICLE CONTROL SYSTEM

(71) Applicant: Mazda Motor Corporation, Hiroshima (JP)

(72) Inventors: Yuki Tsuchitori, Aki-gun (JP); Manabu Sasahara, Aki-gun (JP); Shigeyoshi Okunishi, Aki-gun (JP); Hiroki Hanae, Aki-gun (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 18/636,798

(22) Filed: Apr. 16, 2024

(65) Prior Publication Data

US 2024/0359680 A1    Oct. 31, 2024

(30) Foreign Application Priority Data

Apr. 26, 2023    (JP) .................. 2023-072281

(51) Int. Cl.
*B60W 10/02* (2006.01)
*B60W 10/06* (2006.01)
(Continued)

(52) U.S. Cl.
CPC .......... *B60W 20/10* (2013.01); *B60W 10/024* (2020.02); *B60W 10/06* (2013.01);
(Continued)

(58) Field of Classification Search
CPC .... B60W 20/10; B60W 10/024; B60W 10/06; B60W 10/08; B60W 30/146; B60W 10/02; B60W 30/18027; B60W 30/18063; B60W 2552/15; B60W 2710/021; B60W 2710/023

See application file for complete search history.

(56) References Cited

U.S. PATENT DOCUMENTS 9,989,127 B2    6/2018 Kamada et al.
10,870,423 B1* 12/2020 Orzechowski .......... B60T 8/173
2019/0218983 A1* 7/2019 Northrup ........... B60K 23/0808

FOREIGN PATENT DOCUMENTS

DE    10308713 B4 *  5/2017 ............. B60K 28/16
GB     2553532 A  *  3/2018 ............. B60K 6/485
(Continued)

*Primary Examiner* — Justin Holmes
(74) *Attorney, Agent, or Firm* — Alleman Hall & Tuttle LLP

(57) ABSTRACT

A control system of a vehicle includes a driving source configured to generate a driving force of the vehicle and transmit the driving force to driving wheels, without intervention of a torque converter, a transmission provided between the driving source and the driving wheels, a friction engagement element used for starting the vehicle, the friction engagement element being provided between the driving source and the driving wheels so as to be engageable and disengageable, and a controller configured to control an engaging force of the friction engagement element to adjust the driving force transmitted from the driving source to the driving wheels. The controller sets a target acceleration of the vehicle based on a rotational speed difference between an input rotational speed and an output rotational speed of the transmission, and controls the engaging force based on the target acceleration.

8 Claims, 5 Drawing Sheets

(51) Int. Cl.
*B60W 10/08* (2006.01)
*B60W 20/10* (2016.01)
*B60W 30/14* (2006.01)
*B60W 30/18* (2012.01)

(52) U.S. Cl.
CPC .......... *B60W 10/08* (2013.01); *B60W 30/146* (2013.01); *B60W 10/02* (2013.01); *B60W 30/18027* (2013.01); *B60W 30/18063* (2013.01); *B60W 2552/15* (2020.02); *B60W 2710/021* (2013.01); *B60W 2710/023* (2013.01)

(56) References Cited

FOREIGN PATENT DOCUMENTS

| JP | 7071945 B2 * | 5/2022 |
| WO | 2016063857 A1 | 4/2016 |

\* cited by examiner

GAIN MAP

| | | ROAD SURFACE GRADIENT (%) | | | | |
|---|---|---|---|---|---|---|
| | | 0 | 5 | 15 | 25 | 30 |
| VEHICLE SPEED (km/h) | -10 | 1 | 1 | 1 | 3 | 4 |
| | -5 | 1 | 1 | 1 | 3 | 4 |
| | 0 | 1 | 1 | 1 | 1.5 | 2 |
| | 5 | 1 | 1 | 1 | 1 | 1 |
| | 10 | 1 | 1 | 1 | 1 | 1 |

⇩ APPLY GAIN

MAXIMUM ACCELERATION

| | | ROAD SURFACE GRADIENT (%) | | | | |
|---|---|---|---|---|---|---|
| | | 0 | 5 | 15 | 25 | 30 |
| VEHICLE SPEED (km/h) | -10 | A1 | A1 | A1 | 3×A1 | 4×A1 |
| | -5 | A1 | A1 | A1 | 3×A1 | 4×A1 |
| | 0 | A1 | A1 | A1 | 1.5×A1 | 2×A1 |
| | 5 | A1 | A1 | A1 | A1 | A1 |
| | 10 | A1 | A1 | A1 | A1 | A1 |

VEHICLE CONTROL SYSTEM

TECHNICAL FIELD

The present disclosure relates to a control system of a vehicle in which a driving force from a driving source, such as an engine, is transmitted to driving wheels without intervention of a torque converter.

BACKGROUND OF THE DISCLOSURE

Generally, in vehicles having an automatic transmission, a torque converter is widely used to transmit a driving force utilizing fluid. Such a vehicle causes a phenomenon (so-called "creep") in which the vehicle moves slowly when an automatic transmission is set at a traveling range (D-range, R-range, etc.), even if a driver is not stepping on an accelerator pedal, because a driving force of an engine in an idling state is transmitted to driving wheels. This creep is realized by the driving force (so-called "creep force") which is smoothly transmitted via fluid inside the torque converter.

On the other hand, in recent years, vehicles using an automatic transmission which does not have the torque converter have been developed aiming at, for example, reducing slip loss of the torque converter, and reducing cost to provide the torque converter. For example, WO2016/063857A1 discloses one example of such a vehicle which does not have a torque converter.

Meanwhile, in the above-described vehicle which does not have the torque converter, there is a demand for generating a natural creep force like the vehicle having the torque converter by eliminating the feeling of discomfort given to the driver because of not having the creep and providing the convenience of the creep. Therefore, the present inventors came up with an idea of controlling an engaging force of friction engagement elements which are provided engageable and disengageable on a power transmission path between the engine and the driving wheels in the vehicle which does not have the torque converter so that the driving force transmitted from the engine to the driving wheels is adjusted in order to generate a natural driving force equivalent to the creep force.

SUMMARY OF THE DISCLOSURE

Thus, the present disclosure is made in order to solve the problem of the conventional technology described above, and one purpose thereof is to generate a natural driving force equivalent to a creep force in a control system of a vehicle in which a driving force from a driving source is transmitted to driving wheels without intervention of a torque converter.

In order to achieve the above-described purpose, the present disclosure provides a control system of a vehicle, which includes a driving source configured to generate a driving force of the vehicle and transmit the driving force to driving wheels, without intervention of a torque converter, a transmission provided between the driving source and the driving wheels, a friction engagement element used for starting the vehicle, the friction engagement element being provided between the driving source and the driving wheels so as to be engageable and disengageable, and a controller configured to control an engaging force of the friction engagement element to adjust the driving force transmitted from the driving source to the driving wheels. The controller sets a target acceleration of the vehicle based on a rotational speed difference between an input rotational speed and an output rotational speed of the transmission, and controls the engaging force based on the target acceleration.

According to this configuration, the controller controls the engaging force of the friction engagement element for starting travel of the vehicle to adjust the driving force transmitted from the driving source to the driving wheels, sets the target acceleration based on the input/output rotational speed difference in the transmission, and controls the engaging force of the friction engagement element based on the target acceleration. This input/output rotational speed difference corresponds to the difference between the rotational speed on the driving source side and the rotational speed on the driving wheels side (slip amount), and this indicates the operating state of the vehicle (especially, a vehicle start state). Therefore, by setting the target acceleration based on such an input/output rotational speed difference, and controlling the engaging force of the friction engagement element, the natural driving force equivalent to the creep force of the vehicle having the torque converter can be generated. As a result, it becomes possible to realize the vehicle operation suitable for the feeling of the driver similar to the creep (especially, the smooth vehicle start).

In the present disclosure, the controller may increase the target acceleration as the rotational speed difference increases when the rotational speed difference is less than a given value, and set the target acceleration as a constant value when the rotational speed difference is the given value or more. According to this configuration, when the input/output rotational speed difference is the given value or more, since it corresponds to when the stopping vehicle starts traveling (including the beginning of vehicle start), the controller sets the target acceleration as a comparatively large fixed value. On the other hand, when the input/output rotational speed difference is less than the given value, since it corresponds to when the vehicle moves to some extent (i.e., after the vehicle start), the controller decreases the target acceleration as the input/output rotational speed difference decreases. Therefore, the vehicle start operation suitable for the feeling of the driver can be realized more effectively.

In the present disclosure, the controller may impose a limitation to the target acceleration to be set, based on a braking pressure corresponding to operation of a brake pedal by a driver. According to this configuration, by limiting the target acceleration based on the braking pressure, the vehicle operation suitable for the feeling of the driver can be realized when the driver is operating the brake pedal, thereby suppressing fuel efficiency degradation due to the unnecessary acceleration being given.

In the present disclosure, the controller may change the target acceleration based on a road surface gradient of a traveling road of the vehicle. According to this configuration, since the controller changes the target acceleration based on the road surface gradient of the traveling road of the vehicle, a sliding down of the vehicle on a slope (especially, an uphill road) can be suppressed.

In the present disclosure, the controller may change the target acceleration based on a vehicle speed of the vehicle, in addition to the road surface gradient. According to this configuration, when an unintentional vehicle speed resulting from the slope is caused, the sliding down of the vehicle can be suppressed effectively by changing the target acceleration according to the vehicle speed and the road surface gradient.

In the present disclosure, the controller may change the target acceleration according to the road surface gradient, when the controller determines based on the vehicle speed that the vehicle is stopped or travels rearward. According to this configuration, when the vehicle is stopped or travels rearward because of the slopes, the target acceleration can be changed and the sliding down of the vehicle can be suppressed more effectively.

In the present disclosure, the controller may forbid the change in the target acceleration based on the road surface gradient, when a temperature of oil for the transmission is a given value or more. According to this configuration, when the temperature of oil for the transmission is high, generation of heat of the friction engagement element and temperature rise of the entire transmission resulting from the target acceleration change (increase) can be suppressed to prevent durability degradation of these apparatuses.

DETAILED DESCRIPTION OF THE DISCLOSURE

Hereinafter, a control system of a vehicle according to one embodiment of the present disclosure is described with reference to the accompanying drawings.
[Device Configuration]

Figure 1:
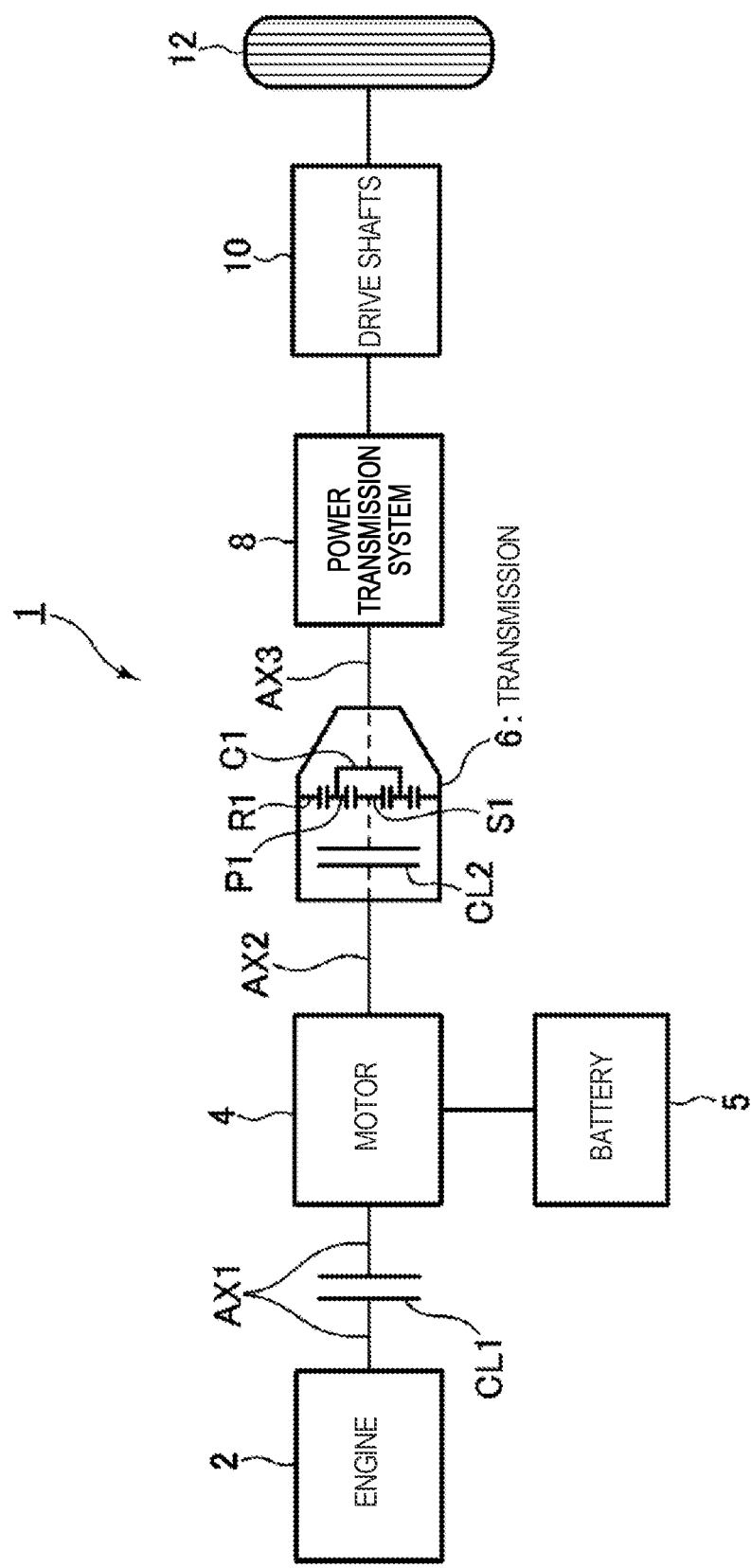
FIG. 1 is an outline block diagram illustrating a vehicle to which a control system of a vehicle according to one embodiment of the present disclosure is applied.

FIG. 1 is an outline block diagram illustrating a vehicle to which the control system of the vehicle according to the embodiment of the present disclosure is applied. This vehicle is constituted as a so-called "hybrid vehicle."

As illustrated in FIG. 1, a vehicle 1 mainly includes an engine 2 (e.g., an internal combustion engine, such as a gasoline engine, which is an example of a "driving source" in the present disclosure) which generates a driving force for driving the vehicle 1, a motor 4 (which is another example of a "driving source") which is provided downstream of the engine 2 in a power transmission path of the vehicle 1 and generates the driving force for driving the vehicle 1, a battery 5 which feeds and receives electric power to/from the motor 4 via an inverter, etc. (not illustrated), a transmission (automatic transmission) 6 which is provided downstream of the motor 4 in the power transmission path of the vehicle 1 and shifts gear (i.e., changes a rotational speed of the engine 2 and/or the motor 4), a power transmission system 8 which transmits the driving force from the transmission 6 to downstream, drive shafts 10 which drive driving wheels 12 by the driving force from the power transmission system 8, and the wheels (driving wheels) 12. In such a vehicle 1, the transmission 6 does not have a torque converter, and the driving force from the engine 2 is transmitted to the driving wheels 12, without intervention of the torque converter.

An output shaft of the engine 2 and a rotation shaft of the motor 4 are coaxially coupled to each other by a shaft AX1 via a first clutch CL1 which is engageable and disengageable (connectable and disconnectable). This first clutch CL1 changes between an "engaged state" and a "disengaged state" of the driving force between the engine 2 and the motor 4. In detail, the first clutch CL1 changes the state between a disengaged state and an engaged state (including a slipping state or a fully engaged state) according to a hydraulic pressure given thereto. For example, the first clutch CL1 is comprised of a dry multiplate clutch or a wet multiplate clutch having a transmission torque capacity that is changeable by controlling a clutch hydraulic fluid flow rate and/or a clutch hydraulic pressure continuously or in a stepwise fashion by a motor or solenoid (not illustrated).

The rotation shaft of the motor 4 and a rotation shaft of the transmission 6 are coaxially coupled to each other via a shaft (input shaft) AX2. The transmission 6 includes therein one or more planetary gear sets each including a sun gear S1, a ring gear R1, pinion gears P1 (planet gears), and a carrier C1, and friction engagement elements, such as a clutch or a brake, and it is an automatic transmission having a function for automatically changing a gear stage (gear ratio) according to a vehicle speed and an engine speed. The ring gear R1 is disposed coaxially with the sun gear S1, and the pinion gears P1 are disposed between the sun gear S1 and the ring gear R1 so as to mesh with both the sun gear S1 and the ring gear R1. The carrier C1 holds the pinion gears P1 so that the pinion gears P1 are autorotatable and are revolvable around the sun gear S1.

Further, the transmission 6 includes therein a second clutch CL2 which is engageable and disengageable (connectable and disconnectable), and the second clutch CL2 changes between the "engaged state" and the "disengaged state" of the driving force between upstream of the transmission 6 (the engine 2 and the motor 4) and downstream of the transmission 6 (the driving wheels 12, etc.). In detail, the second clutch CL2 changes the state between the disengaged state and the engaged state (including the slipping state or the fully engaged state) according to the hydraulic pressure given thereto. For example, the second clutch CL2 is comprised of a dry multiplate clutch or a wet multiplate clutch, which has a transmission torque capacity that is changeable by controlling a clutch hydraulic fluid flow rate and/or a clutch hydraulic pressure continuously or in a stepwise fashion by a motor and solenoid (not illustrated). Note that the second clutch CL2 is an example of a "friction engagement element" in the present disclosure. Particularly, the second clutch CL2 is a friction engagement element which is used in order to start traveling the vehicle 1 by being gradually engaged, while slipping when start traveling.

In fact, the second clutch CL2 is comprised of a large number of clutches used in order to change the gear ratio (gear stage) to various gear ratios in the transmission 6. Although in FIG. 1 only one planetary gear set is illustrated for simplification, the transmission 6 is actually provided with a plurality of planetary gear sets. By selectively engaging the friction engagement elements, such as a plurality of clutches represented by the second clutch CL2 and a plurality of brakes (not illustrated) to change the power transmission path passing through any of the planetary gear sets, a plurality of forward gear ratios and a rear gear ratio can be realized when the transmission 6 is set to a traveling range (the D-range or the R-range).

The driving force is inputted into the power transmission system 8 via an output shaft AX3 of the transmission 6. The power transmission system 8 is constituted including a differential gear which distributes the driving force to the pair of left and right driving wheels 12, and a final gear.

Note that the vehicle 1 can change a traveling mode by changing a state between the "engaged state" and the "disengaged state" of the first clutch CL1. That is, the vehicle 1 has a traveling mode in which the first clutch CL1 is disengaged to propel the vehicle 1 using the driving force of the motor 4 and without using the driving force of the engine 2, and a traveling mode in which the first clutch CL1 is engaged to propel the vehicle 1 at least using the driving force of the engine 2. The former traveling mode is a so-called "EV traveling mode," and the latter traveling mode is either an engine traveling mode in which the vehicle 1 travels only using the driving force of the engine 2, and a hybrid traveling mode in which the vehicle 1 travels using the driving forces of both the engine 2 and the motor 4.

Figure 2:
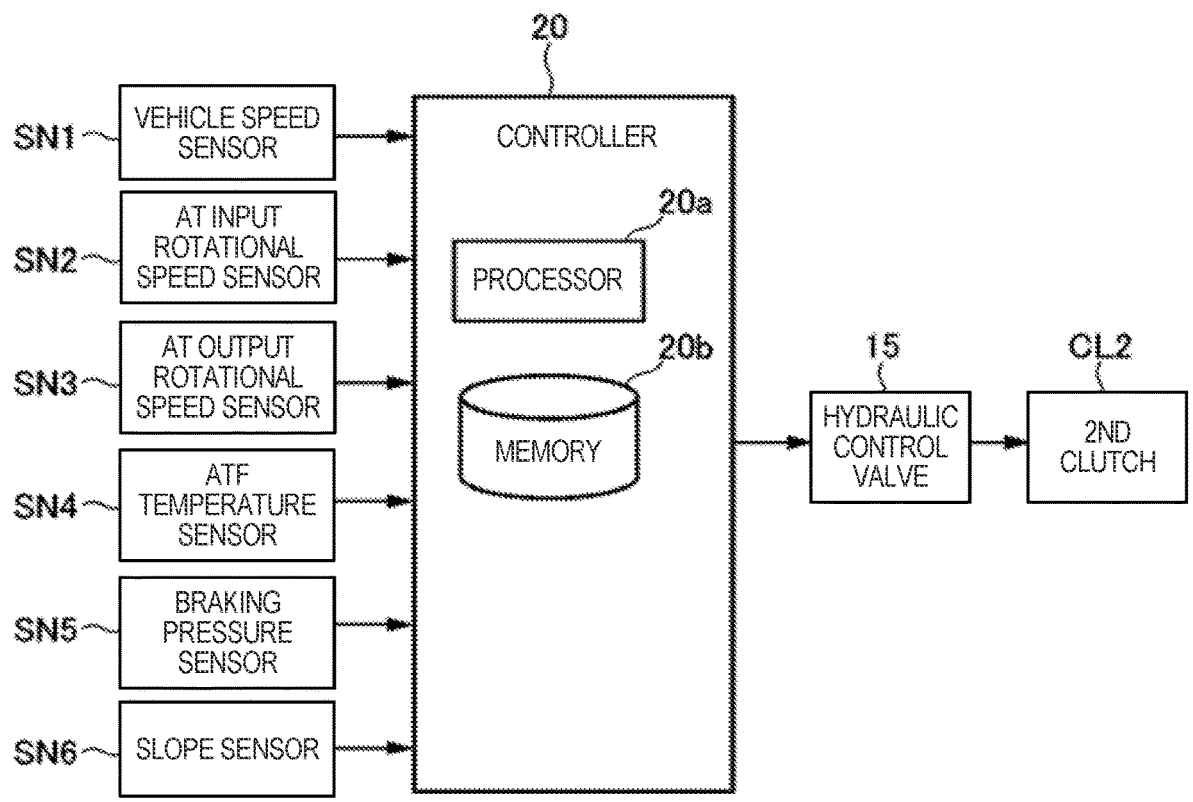
FIG. 2 is a block diagram illustrating an electric configuration of the control system of the vehicle according to the embodiment of the present disclosure.

Next, FIG. 2 is a block diagram illustrating an electric configuration of the control system of the vehicle according to the embodiment of the present disclosure.

As illustrated in FIG. 2, signals from a vehicle speed sensor SN1, an AT input rotational speed sensor SN2, an AT output rotational speed sensor SN3, an ATF temperature sensor SN4, a braking pressure sensor SN5, and a slope sensor SN6 are inputted into a controller 20. The vehicle speed sensor SN1 detects a traveling speed of the vehicle 1. The AT input rotational speed sensor SN2 detects a rotational speed of the input shaft AX2 (input rotational speed) of the transmission 6, and the AT output rotational speed sensor SN3 detects a rotational speed of the output shaft AX3 (output rotational speed) of the transmission 6. The ATF temperature sensor SN4 detects a temperature of ATF (Automatic Transmission Fluid) as automatic transmission fluid (an example of lubricating oil) in the transmission 6. The braking pressure sensor SN5 detects a braking pressure (corresponding to a brake fluid pressure generated in a hydraulic brake equipment) corresponding to operation of a brake pedal by the driver. The slope sensor SN6 is comprised of an acceleration sensor, and it detects a road surface gradient of a traveling road of the vehicle 1 (corresponding to an inclination of the vehicle 1 on the traveling road in the front-and-rear direction). Note that the ATF temperature is not limited to being detected using the ATF temperature sensor SN4, but the ATF temperature may be estimated without using a sensor.

The controller 20 is comprised of circuitry based on a well-known microcomputer. The controller 20 includes one or more microprocessors 20a as CPUs (Central Processing Units) which execute a program, memory 20b which is comprised of RAM (Random Access Memory) and ROM (Read Only Memory) and stores the program and data, and an input/output bus which performs input/output of electric signals. Note that the controller 20 may be comprised of an ECU (Electronic Control Unit) or a TCM (Transmission Control Module).

In detail, the controller 20 mainly outputs a control signal to a hydraulic control valve 15 applied to the second clutch CL2 based on detection signals from the sensors SN1-SN6 to control a hydraulic pressure given to the second clutch CL2. Particularly, in this embodiment, the controller 20 controls the hydraulic pressure given to the second clutch CL2 via the hydraulic control valve 15 to control an engaging force (in other words, an engaging pressure or an engaging torque) of the second clutch CL2 in the slipping state. This adjusts the driving force transmitted from the engine 2 to the driving wheels 12.

[Controlled Properties]

Next, the control performed by the controller 20 in this embodiment is described. In this embodiment, the vehicle 1 does not have a torque converter, and the controller 20 controls the engaging force of the second clutch CL2 in the slipping state by the hydraulic control valve 15 to adjust the driving force transmitted from the engine 2 in an idling state to the driving wheels 12, when the transmission 6 is set to the traveling range and the driver does not step on an accelerator pedal. Thus, the natural driving force equivalent to the creep force generated in the vehicle having a torque converter is given to the vehicle 1.

In detail, the controller 20 sets a target acceleration to be generated according to the state of the vehicle 1 in order to realize vehicle operation suitable for feeling of the driver, such as the creep in the vehicle having the torque converter, and controls the engaging force of the second clutch CL2 based on this target acceleration. In this case, the controller 20 controls the hydraulic control valve 15 to increase the engaging force of the second clutch CL2 so that a larger driving force of the engine 2 is transmitted to the driving wheels 12 as the target acceleration increases. When the target acceleration is smaller or decreases, the controller 20 performs the opposite control.

Below, referring to FIGS. 3 to 6, a method of setting the target acceleration which is used for controlling the engaging force of the second clutch CL2 in this embodiment is described.

Figure 3:
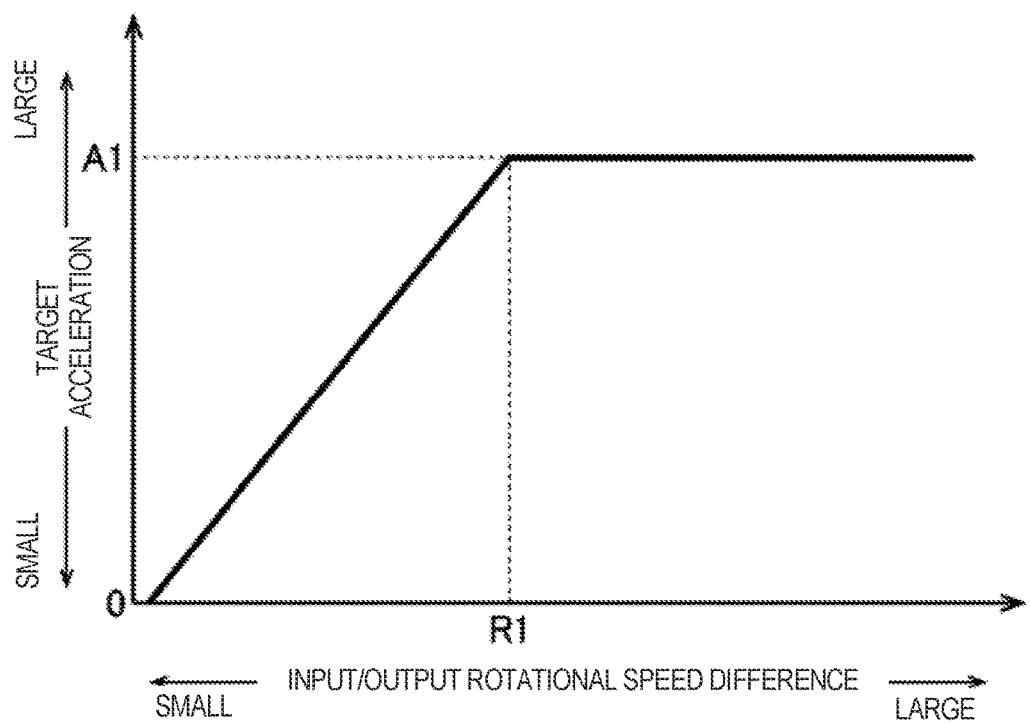
FIG. 3 is a graph illustrating a method of setting a target acceleration based on an input/output rotational speed difference in a transmission in the embodiment of the present disclosure.

First, referring to FIG. 3, in this embodiment, a method of setting the target acceleration based on a rotational speed difference between the input rotational speed and the output rotational speed (input/output rotational speed difference) in the transmission 6 is described. In FIG. 3, the horizontal axis indicates the input/output rotational speed difference in the transmission 6 (corresponding to a difference between the rotational speed on the engine 2 side and the rotational speed on the driving wheels 12 side (i.e., a slip amount)), and the vertical axis indicates the target acceleration. FIG. 3 illustrates a map in which the target acceleration to be set according to the input/output rotational speed difference is defined.

As illustrated in FIG. 3, the controller 20 increases the target acceleration as the input/output rotational speed difference in the transmission 6 increases. In detail, when the input/output rotational speed difference is less than a given value R1, the controller 20 increases the target acceleration as the input/output rotational speed difference increases, and when the input/output rotational speed difference is the given value R1 or more, the controller 20 fixes the target acceleration to a given value A1. This given value A1 is the maximum value of the target acceleration (maximum target acceleration) set based on the input/output rotational speed difference. The given value A1 may be about 0.5 m/s².

The reason for thus setting the target acceleration based on the input/output rotational speed difference is as follows. First, when the input/output rotational speed difference in the transmission 6 is comparatively large (in detail, when the input/output rotational speed difference is the given value R1 or more), it corresponds to when the stopped vehicle 1 starts traveling (vehicle start). During such a vehicle start, since the vehicle 1 should generate a comparatively large acceleration, the controller 20 sets the target acceleration to the maximum target acceleration A1, regardless of the input/output rotational speed difference. Then, when the input/output rotational speed difference in the transmission 6 is comparatively small (in detail, the input/output rotational speed difference is less than the given value R1), it corresponds to when the vehicle 1 moves to some extent (i.e., after vehicle start). When the vehicle 1 is moving, since it is not necessary for the vehicle 1 to generate such a large acceleration, the controller 20 decreases the target acceleration gradually according to the input/output rotational speed difference. By setting the target acceleration based on the input/output rotational speed difference, vehicle operation suitable for the feeling of the driver similar to the creep can be realized.

Figures 4, 5:
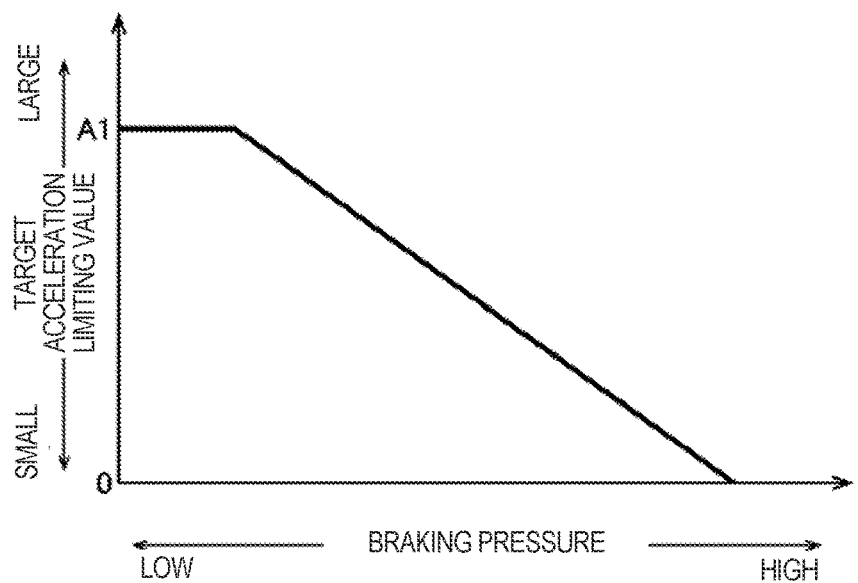
FIG. 4 is a graph illustrating a method of limiting the target acceleration based on a braking pressure in the embodiment of the present disclosure.
FIG. 5 illustrates maps for explaining a method of changing the target acceleration based on a road surface gradient and a vehicle speed in the embodiment of the present disclosure.

Next, referring to FIG. 4, a method of imposing a limitation to the target acceleration based on the braking pressure corresponding to operation of the brake pedal by the driver in this embodiment is described. In FIG. 4, the horizontal axis indicates the braking pressure, the vertical axis indicates a target acceleration limiting value applied to the target acceleration. FIG. 4 illustrates a map in which the target acceleration limiting value to be applied according to the braking pressure is defined. The target acceleration limiting value is applied to the target acceleration set based on the input/output rotational speed difference as described above. That is, when the target acceleration set based on the input/output rotational speed difference is more than the target acceleration limiting value, the controller 20 limits this target acceleration and applies the target acceleration limiting value as the target acceleration to be set. On the other hand, when the target acceleration set based on the input/output rotational speed difference is the target acceleration limiting value or less, the controller 20 applies this target acceleration as it is, without limiting the target acceleration.

In detail, as illustrated in FIG. 4, the controller 20 decreases the target acceleration limiting value from the maximum target acceleration A1 described above, as the braking pressure increases. This is because, when the driver operates the brake pedal and the braking pressure increases, since the vehicle 1 slows down or stops, it is not necessary for the vehicle 1 to generate the acceleration. Thus, by limiting the target acceleration based on the braking pressure, the vehicle operation suitable for the feeling of the driver can be realized when the driver operates the brake pedal, and the fuel efficiency degradation due to the unnecessary acceleration being given can be suppressed.

Figure 6:
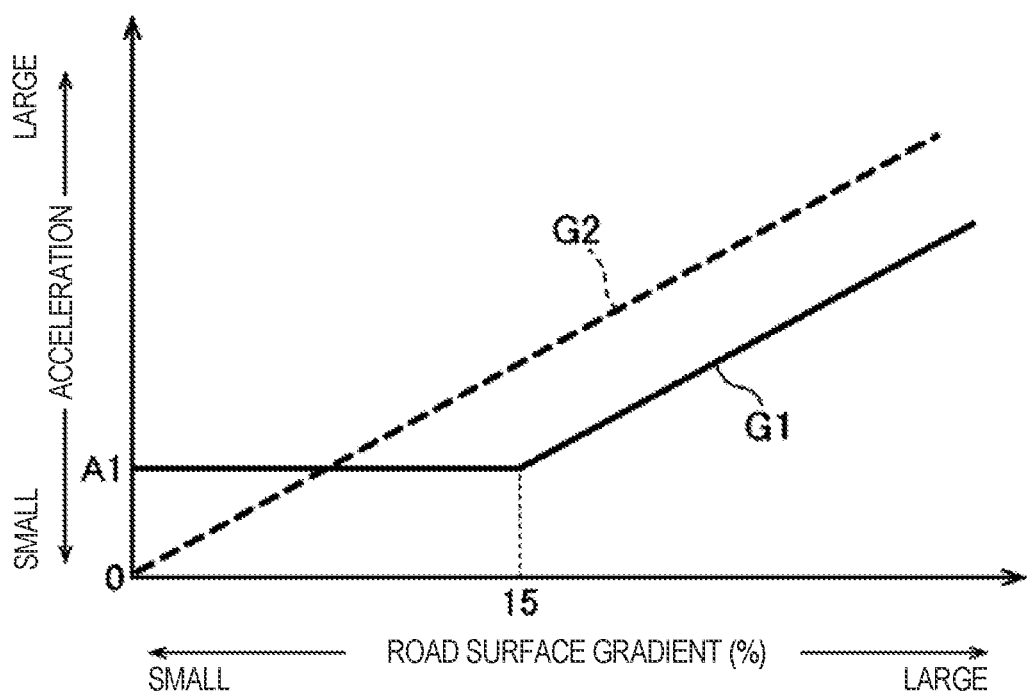
FIG. 6 is a graph illustrating one example of the target acceleration changed according to the road surface gradient in the embodiment of the present disclosure.

Next, referring to FIGS. 5 and 6, a method of changing (in detail, increasing) the target acceleration based on the road surface gradient and the vehicle speed in this embodiment is described. In FIG. 5, a gain map which defines a gain for changing the target acceleration based on the road surface gradient (%) and the vehicle speed (km/h) is illustrated at the upper side. This gain map is defined so that the gain increases as the road surface gradient increases, and the gain increases as the vehicle speed decreases (a negative vehicle speed indicates that the vehicle travels rearward). In detail, when the road surface gradient is 15% or less, the gain is constant at "1," and when the road surface gradient is more than 15%, the gain increases as the road surface gradient increases. Further, when the vehicle speed is more than 0 (i.e., when the vehicle 1 travels forward), the gain is constant at "1," and when the vehicle speed is zero or less (i.e., when the vehicle 1 is stopped or travels rearward), the gain increases as the vehicle speed decreases.

Such a gain is multiplied by the target acceleration (FIGS. 3 and 4) set based on the input/output rotational speed difference and the braking pressure as described above to change (increase) the target acceleration. Therefore, the target acceleration is changed into a larger value as the road surface gradient increases, and the target acceleration is also increased as the vehicle speed decreases. In FIG. 5, the maximum value of the target acceleration (maximum acceleration) changed by applying (multiplying) the gain to the maximum target acceleration A1 described above is illustrated at the lower side.

By changing the target acceleration according to the road surface gradient as described above (in detail, by increasing the target acceleration as the road surface gradient increases), a comparatively large driving force can be applied on a slope where the road surface gradient is large (especially, a climbing road) to prevent a sliding down of the vehicle 1. Further, by changing the target acceleration according to the vehicle speed in addition to the road surface gradient (in detail, by increasing the target acceleration as the vehicle speed decreases), a comparatively large driving force can be applied, when the vehicle 1 is stopped or travels rearward on a slope (especially, a climbing road) to effectively prevent the sliding down of the vehicle 1.

Next, referring to FIG. 6, one example of the target acceleration changed according to the road surface gradient is described. In FIG. 6, the horizontal axis indicates the road surface gradient, and the vertical axis indicates the acceleration. A graph G1 of a solid line illustrates one example of a relationship between the road surface gradient and the maximum value of the target acceleration (maximum acceleration) changed according to the road surface gradient. In this example, when the road surface gradient is 15% or less, the maximum acceleration is constant, but, when the road surface gradient is more than 15%, the maximum acceleration increases as the road surface gradient increases. Note that this example is a case where the vehicle speed is zero or less.

On the other hand, in FIG. 6, a graph G2 of a broken line illustrates an acceleration which balances with the road surface gradient (i.e., an acceleration required for stopping the vehicle 1 on a slope without backing up). FIG. 6 shows that the maximum acceleration which is defined in the above-described graph G1 and is applied according to the road surface gradient is smaller than the acceleration of this graph G2. Therefore, the vehicle moves rearward on a slope, even if the maximum acceleration of the graph G1 is given. However, since a difference in the acceleration between the graph G1 and the graph G2 is small, the acceleration when backing up on a slope decreases, thereby fully securing the safety. In addition, since the difference in the acceleration between the graph G1 and the graph G2 is constant regardless of the road surface gradient, the acceleration when backing up on a slope becomes constant. Therefore, the safety can be secured, while suppressing the feeling of discomfort given to the driver.

Note that the reason why the maximum acceleration (graph G1) which is applied according to the road surface gradient is set smaller than the acceleration (graph G2) which balances with the road surface gradient is for suppressing wear of the second clutch CL2 resulting from increasing the engaging force in order to apply the large maximum acceleration (i.e., for protecting the second clutch CL2).

Figure 7:
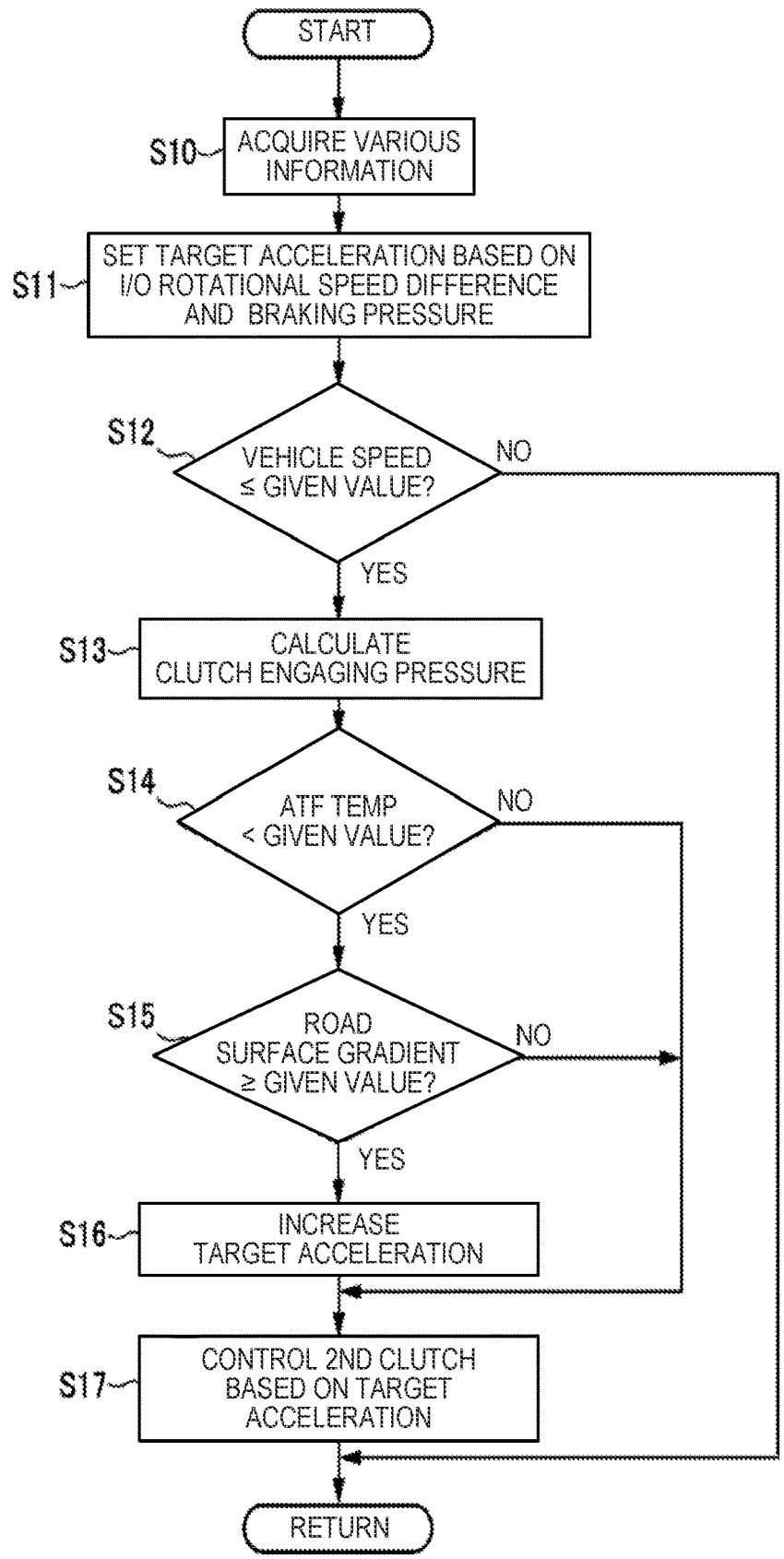
FIG. 7 is a flowchart illustrating a control of a second clutch according to the target acceleration in the embodiment of the present disclosure.

Next, referring to FIG. 7, a concrete flow of a control performed by the controller 20 in this embodiment is described. FIG. 7 is a flowchart illustrating a control of the second clutch CL2 according to the target acceleration in this embodiment. This control is repeatedly performed by the microprocessor 20a in the controller 20 based on the program stored in the memory 20b at a given cycle. Note that the flow of FIG. 7 is typically performed when the transmission 6 is set to the traveling range (D-range or R-range) and the driver does not step on the accelerator pedal (i.e., when the engine 2 is in an idling state).

First, at Step S10, the controller 20 acquires a variety of information corresponding to the signals from the sensors SN1-SN6 (see FIG. 2). In detail, the controller 20 acquires at least the vehicle speed detected by the vehicle speed sensor SN1, the input rotational speed detected by the AT input rotational speed sensor SN2, the output rotational speed detected by the AT output rotational speed sensor SN3, the ATF temperature detected by the ATF temperature sensor SN4, the braking pressure detected by the braking pressure sensor SN5, and the road surface gradient detected by the slope sensor SN6.

Next, at Step S11, the controller 20 calculates the input/output rotational speed difference based on the input rotational speed and the output rotational speed which are acquired at Step S10, and sets the target acceleration based on this input/output rotational speed difference and the braking pressure acquired at Step S10. In detail, the controller 20 first obtains the target acceleration corresponding to the input/output rotational speed difference based on the map as illustrated in FIG. 3. Then, based on the map as illustrated in FIG. 4, the controller 20 acquires the target acceleration limiting value corresponding to the braking pressure, and limits the target acceleration corresponding to the input/output rotational speed difference by this target acceleration limiting value. In this case, if the target acceleration corresponding to the input/output rotational speed difference is more than the target acceleration limiting value, the controller 20 limits this target acceleration and sets the target acceleration limiting value as the target acceleration to be set, and on the other hand, if the target acceleration corresponding to the input/output rotational speed difference is the target acceleration limiting value or less, the controller 20 sets the target acceleration as it is, without limiting the target acceleration.

Then, at Step S12, the controller 20 determines whether the vehicle speed acquired at Step S10 is a given value or less. This given value is set as a vehicle speed (e.g., about 5 km/h) generated when the engine 2 is driven at a target idling speed, and the first and second clutches CL1 and CL2 are fully engaged. This vehicle speed corresponds to a steady vehicle speed generated by the creep in common vehicles having a torque converter. If the vehicle speed is determined to be the given value or less as a result of the determination of Step S12 (Step S12: Yes), the controller 20 shifts to Step S13. On the other hand, if the vehicle speed is not determined to be the given value or less (i.e., if the vehicle speed is higher than the given value) (Step S12: No), the controller 20 escapes from the routine according to this control. In this embodiment, when the vehicle speed which exceeds the steady vehicle speed by the creep as described above has already occurred, the controller 20 does not control the second clutch CL2 for generating the natural driving force equivalent to the creep force.

Then, at Step S13, the controller 20 calculates the engaging pressure (clutch engaging pressure) of the second clutch CL2. In detail, the controller 20 calculates the current clutch engaging pressure based on the control signal supplied to the hydraulic control valve 15, and various property values (e.g., the hydraulic pressure given to the second clutch CL2 detected by the sensor).

Then, at Step S14, the controller 20 determines whether the ATF temperature acquired at Step S10 is less than the given value (e.g., about 90° C.). If the ATF temperature is determined to be less than the given value (Step S14: Yes), the controller 20 shifts to Step S15. Then, at Step S15, the controller 20 determines whether the road surface gradient acquired at Step S10 is the given value (e.g., about 15%) or more. If the road surface gradient is determined to be the given value or more (Step S15: Yes), the controller 20 shifts to Step S16.

At Step S16, the controller 20 changes (increases) the target acceleration set at Step S11, according to the road surface gradient and the vehicle speed. In detail, the controller 20 changes the target acceleration by the gain according to the road surface gradient and the vehicle speed using the gain map illustrated in FIG. 5. In this case, the controller 20 increases the target acceleration as the road surface gradient increases, and also increases the target acceleration as the vehicle speed decreases. In more detail, if the vehicle speed is more than 0 (i.e., if the vehicle 1 travels forward), the controller 20 does not change the target acceleration, regardless of the road surface gradient, and, on the other hand, if the vehicle speed is 0 or less (i.e., when the vehicle 1 is stopped or travels rearward), the controller 20 increases the target acceleration as the road surface gradient increases and as the vehicle speed decreases. Then, the controller 20 shifts to Step S17.

On the other hand, if the ATF temperature is not determined to be less than the given value (Step S14: No), the controller 20 shifts to Step S17, without performing Step S16. That is, the controller 20 does not increase the target acceleration, when the ATF temperature is high. This is to suppress the generation of heat of the second clutch CL2 and the temperature rise of the entire transmission 6 resulting from the increase in the engaging force of the second clutch CL2 due to the increase in the target acceleration to prevent the durability degradation of these apparatuses. Further, if the road surface gradient is not determined to be the given value or more (Step S15: No), the controller 20 shifts to Step S17, without performing Step S16. In this case, since the road surface gradient is small, the sliding down of the vehicle 1 on a slope does not become a problem. Therefore, the controller 20 does not increase the target acceleration.

Then, at Step S17, the controller 20 controls the engaging force of the second clutch CL2 so that the vehicle 1 generates the target acceleration set at Step S11 or the target acceleration changed at Step S16. In detail, the controller 20 calculates the engaging force of the second clutch CL2 required for generating the target acceleration based on the current clutch engaging pressure (corresponding to the current engaging force) calculated at Step S13, and controls the hydraulic control valve 15 to realize this engaging force. After Step S17, the controller 20 escapes from the routine according to this control.

Operation and Effects

Next, operation and effects by the control system of the vehicle according to this embodiment are described. In this embodiment, the controller 20 controls the engaging force of the second clutch CL2 to adjust the driving force transmitted from the engine 2 to the driving wheels 12, and when the driver does not step on the accelerator pedal, the controller 20 sets the target acceleration based on the input/output rotational speed difference in the transmission 6, and controls the engaging force of the second clutch CL2 based on the target acceleration. This input/output rotational speed difference corresponds to the difference between the rotational speed on the engine 2 side and the rotational speed on the driving wheels 12 side (slip amount), and this indicates the operating state of the vehicle 1 (especially, a vehicle start state). Therefore, when the driver does not step on the accelerator pedal, by setting the target acceleration based on such an input/output rotational speed difference, and controlling the engaging force of the second clutch CL2, the natural driving force equivalent to the creep force of the vehicle having the torque converter can be generated. As a result, it becomes possible to realize the vehicle operation suitable for the feeling of the driver similar to the creep (especially, the smooth vehicle start).

Further, in this embodiment, the controller 20 increases the target acceleration as the input/output rotational speed difference increases, when the input/output rotational speed difference is less than the given value R1, and it sets the target acceleration as the constant value, when the input/output rotational speed difference is the given value R1 or more. That is, when the input/output rotational speed difference is the given value R1 or more, since it corresponds to when the stopping vehicle 1 starts traveling (including the beginning of vehicle start), the controller 20 sets the target acceleration as a comparatively large fixed value. On the other hand, when the input/output rotational speed difference is less than the given value R1, since it corresponds to when the vehicle 1 moves to some extent (i.e., after the vehicle start), the controller 20 decreases the target acceleration as the input/output rotational speed difference decreases. Therefore, the vehicle start operation suitable for the feeling of the driver can be realized more effectively.

Further, in this embodiment, the controller 20 imposes the limitation to the target acceleration to be set, based on the braking pressure corresponding to operation of the brake pedal by the driver. Thus, by limiting the target acceleration based on the braking pressure, the vehicle operation suitable for the feeling of the driver can be realized when the driver is operating the brake pedal, thereby suppressing the fuel efficiency degradation due to the unnecessary acceleration being given.

In this embodiment, since the controller 20 changes the target acceleration based on the road surface gradient of the traveling road of the vehicle 1, the sliding down of the vehicle 1 on a slope (especially, a climbing road) can be suppressed.

Further, in this embodiment, the controller 20 changes the target acceleration based on the vehicle speed of the vehicle 1 in addition to the road surface gradient. Therefore, when an unintentional vehicle speed resulting from the slope is caused, the sliding down of the vehicle 1 can be suppressed effectively by changing the target acceleration according to the vehicle speed and the road surface gradient.

Further, in this embodiment, the controller 20 changes the target acceleration according to the road surface gradient, when it is determined based on the vehicle speed that the vehicle 1 is stopped or travels rearward. Therefore, when the vehicle 1 is stopped or travels rearward because of the slopes, the target acceleration can be changed and the sliding down of the vehicle 1 can be suppressed more effectively.

Further, in this embodiment, the controller 20 forbids the change of the target acceleration based on the road surface gradient, when the ATF temperature of the transmission 6 is the given value or more. Therefore, when the ATF temperature is high, the generation of heat of the second clutch CL2 and the temperature rise of the entire transmission 6 resulting from the target acceleration change (increase) can be suppressed to prevent the durability degradation of these apparatuses.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
2 Engine (Driving Source)
4 Motor (Driving Source)
6 Transmission
12 Wheel (Driving Wheel)
15 Hydraulic Control Valve
20 Controller
CL1 First Clutch
CL2 Second Clutch (Friction Engagement Element)
SN1 Vehicle Speed Sensor
SN2 AT Input Rotational Speed Sensor
SN3 AT Output Rotational Speed Sensor
SN4 ATF Temperature Sensor
SN5 Braking Pressure Sensor
SN6 Slope Sensor

What is claimed is:

1. A control system of a vehicle, comprising:
a driving source configured to generate a driving force of the vehicle and transmit the driving force to driving wheels, without intervention of a torque converter;
a transmission provided between the driving source and the driving wheels;
a friction engagement element used for starting the vehicle, the friction engagement element being provided between the driving source and the driving wheels so as to be engageable and disengageable; and
a controller configured to control an engaging force of the friction engagement element to adjust the driving force transmitted from the driving source to the driving wheels, wherein
the controller sets a target acceleration of the vehicle based on a rotational speed difference between an input rotational speed and an output rotational speed of the transmission, and controls the engaging force based on the target acceleration, and
the controller increases the target acceleration as the rotational speed difference increases when the rotational speed difference is less than a given value, and sets the target acceleration as a constant value when the rotational speed difference is the given value or more.

2. A control system of a vehicle, comprising:
a driving source configured to generate a driving force of the vehicle and transmit the driving force to driving wheels, without intervention of a torque converter;
a transmission provided between the driving source and the driving wheels;
a friction engagement element used for starting the vehicle, the friction engagement element being provided between the driving source and the driving wheels so as to be engageable and disengageable; and
a controller configured to control an engaging force of the friction engagement element to adjust the driving force transmitted from the driving source to the driving wheels, wherein
the controller sets a target acceleration of the vehicle based on a rotational speed difference between an input rotational speed and an output rotational speed of the transmission, and controls the engaging force based on the target acceleration, and the controller imposes a limitation to the target acceleration to be set, based on a braking pressure corresponding to operation of a brake pedal by a driver.

3. A control system of a vehicle, comprising:
a driving source configured to generate a driving force of the vehicle and transmit the driving force to driving wheels, without intervention of a torque converter;
a transmission provided between the driving source and the driving wheels;
a friction engagement element used for starting the vehicle, the friction engagement element being provided between the driving source and the driving wheels so as to be engageable and disengageable; and
a controller configured to control an engaging force of the friction engagement element to adjust the driving force transmitted from the driving source to the driving wheels, wherein
the controller sets a target acceleration of the vehicle based on a rotational speed difference between an input rotational speed and an output rotational speed of the transmission, and controls the engaging force based on the target acceleration, and
the controller changes the target acceleration based on a road surface gradient of a traveling road of the vehicle.

4. The control system of claim 3, wherein the controller changes the target acceleration based on a vehicle speed of the vehicle, in addition to the road surface gradient.

5. The control system of claim 4, wherein the controller changes the target acceleration according to the road surface gradient when the controller determines based on the vehicle speed that the vehicle is stopped or travels rearward.

6. The control system of claim 5, wherein the controller forbids the change in the target acceleration based on the road surface gradient when a temperature of oil for the transmission is a given value or more.

7. The control system of claim 3, wherein the controller forbids the change in the target acceleration based on the road surface gradient when a temperature of oil for the transmission is a given value or more.

8. The control system of claim 4, wherein the controller forbids the change in the target acceleration based on the road surface gradient when a temperature of oil for the transmission is a given value or more.

* * * * *